(12) United States Patent
Bhatnagar et al.

(10) Patent No.: US 9,683,815 B2
(45) Date of Patent: *Jun. 20, 2017

(54) HELMETS FOR PROTECTION AGAINST RIFLE BULLETS

(71) Applicant: HONEYWELL INTERNATIONAL INC., Morristown, NJ (US)

(72) Inventors: Ashok Bhatnagar, Richmond, VA (US); Bradley L. Grunden, Midlothian, VA (US); Brian D. Arvidson, Chester, VA (US); Lori L. Wagner, Richmond, VA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 5 days.

This patent is subject to a terminal disclaimer.

(21) Appl. No.: 14/505,556

(22) Filed: Oct. 3, 2014

(65) Prior Publication Data

US 2015/0020283 A1 Jan. 22, 2015

Related U.S. Application Data

(63) Continuation of application No. 12/004,327, filed on Dec. 20, 2007, now Pat. No. 8,853,105.

(51) Int. Cl.
*F41H 1/08* (2006.01)
*A42B 3/04* (2006.01)
*B32B 5/08* (2006.01)
*F41H 5/04* (2006.01)
*A42B 3/06* (2006.01)
*B32B 38/18* (2006.01)

(52) U.S. Cl.
CPC .............. *F41H 1/08* (2013.01); *A42B 3/04* (2013.01); *A42B 3/063* (2013.01); *B32B 38/1816* (2013.01); *B32B 38/1866* (2013.01); *F41H 5/0485* (2013.01); *B32B 2305/076* (2013.01); *B32B 2305/74* (2013.01); *B32B 2307/558* (2013.01); *B32B 2309/02* (2013.01); *B32B 2309/12* (2013.01); *B32B 2323/00* (2013.01); *B32B 2331/00* (2013.01); *B32B 2375/00* (2013.01); *B32B 2571/02* (2013.01); *Y10S 428/911* (2013.01); *Y10T 156/1002* (2015.01); *Y10T 156/1043* (2015.01); *Y10T 442/2615* (2015.04); *Y10T 442/2623* (2015.04); *Y10T 442/3707* (2015.04); *Y10T 442/3715* (2015.04); *Y10T 442/3732* (2015.04); *Y10T 442/3764* (2015.04); *Y10T 442/3813* (2015.04)

(58) Field of Classification Search
CPC .. A42B 3/04; A42B 3/003; A42B 3/06; A42B 3/063; B32B 2437/04; B32B 2571/02; B32B 5/022; B32B 5/024; B32B 5/026; B32B 5/028; B32B 5/06; B32B 5/10; B32B 2260/03; B32B 2260/20; B32B 2260/023; B32B 2375/00; B32B 2331/00; B32B 2305/076; Y10S 428/911; F41H 1/08; F41H 5/0485; F41H 1/04; F41H 5/04; F41H 5/0471; C08J 5/04; C08J 5/043; C08J 5/046; C08J 5/047; C08J 5/08; Y10T 442/2615; Y10T 442/2623; Y10T 442/3707; Y10T 442/3732; Y10T 442/3762; Y10T 442/3764; Y10T 442/3813
USPC ......... 2/2.5, 6.1, 6.6, 205, 209.12, 410, 411, 2/425, 5; 428/911, 912, 920; 442/134, 442/135, 218, 220, 224, 225, 244, 245, 442/246, 247, 248, 269, 278
See application file for complete search history.

(56) References Cited

U.S. PATENT DOCUMENTS

| | | | |
|---|---|---|---|
| 2,956,916 A | 10/1960 | Voss et al. | |
| 4,137,394 A | 1/1979 | Meihuizen et al. | |
| 4,199,388 A | 4/1980 | Tracy et al. | |
| 4,356,138 A | 10/1982 | Kavesh et al. | |
| 4,403,012 A * | 9/1983 | Harpell | B32B 27/32 |
| | | | 264/257 |
| 4,413,110 A | 11/1983 | Kavesh et al. | |
| 4,457,985 A | 7/1984 | Harpell et al. | |
| 4,778,638 A | 10/1988 | White | |
| 4,868,040 A | 9/1989 | Hallal et al. | |
| 4,908,877 A | 3/1990 | White | |
| 4,953,234 A | 9/1990 | Li et al. | |
| 5,075,904 A | 12/1991 | Shirasaki et al. | |
| 5,112,667 A | 5/1992 | Li et al. | |

(Continued)

FOREIGN PATENT DOCUMENTS

| | | |
|---|---|---|
| CN | 1305667 C | 3/2007 |
| EP | 0412452 | 2/1991 |
| GB | 2253589 | 9/1992 |
| KR | 1020030013888 | 2/2003 |
| KR | 100436948 | 9/2004 |
| KR | 200392560 | 8/2005 |
| WO | 2005001373 | 1/2005 |

OTHER PUBLICATIONS

Supplemental European Search Report for Corresponding European Patent Application No. EP 20080868419.

*Primary Examiner* — Camie Thompson
(74) *Attorney, Agent, or Firm* — Roberts & Roberts, LLP; Richard S. Roberts, Jr.

(57) ABSTRACT

A helmet shell is formed having an outer section of fibrous layers, a middle section of fibrous layers and an inner section of fibrous layers. The outer section layers contain high tenacity abrasive fibers in a resin matrix. The middle section layers contain high strength polyolefin fibers and are in the form of woven or knitted fabrics with a resin matrix. The inner section layers contain high strength polyolefin fibers and are in the form of non-woven fabrics with a resin matrix. The helmet is lightweight and resists penetration of rifle bullets.

20 Claims, No Drawings

(56) References Cited

U.S. PATENT DOCUMENTS

| | | |
|---|---|---|
| 5,343,796 A | 9/1994 | Cordova et al. |
| 5,552,208 A | 9/1996 | Lin et al. |
| 5,660,913 A | 8/1997 | Coppage, Jr. |
| 5,702,657 A | 12/1997 | Yoshida et al. |
| 6,012,178 A | 1/2000 | Schuster et al. |
| 6,103,646 A | 8/2000 | Chiou |
| 6,642,159 B1 * | 11/2003 | Bhatnagar ............. B29C 70/088 428/109 |
| 6,804,829 B2 | 10/2004 | Crye et al. |
| 7,642,206 B1 | 1/2010 | Bhatnagar et al. |
| 7,648,607 B2 | 1/2010 | Morin |
| 7,700,503 B2 * | 4/2010 | Thomas, Jr. .......... F41H 5/0485 2/2.5 |
| 8,853,105 B2 * | 10/2014 | Bhatnagar et al. ........... 442/135 |
| 2013/0212763 A1 * | 8/2013 | Bhatnagar et al. ................ 2/2.5 |

\* cited by examiner

HELMETS FOR PROTECTION AGAINST RIFLE BULLETS

CROSS-REFERENCE TO RELATED APPLICATION

This application is a Continuation of U.S. application Ser. No. 12/004,327, filed Dec. 20, 2007, now U.S. Pat. No. 8,853,105, the entire disclosure of which is incorporated by reference herein.

BACKGROUND OF THE INVENTION

Field of the Invention

This invention relates to protective helmets which are useful for military, law enforcement and other applications. In particular, this invention relates to such helmets which provide protection against rifle bullets.

Description of the Related Art

Protective helmets are well known. Such helmets have been used for military and non-military applications. Examples of the latter include law enforcement uses, sporting uses and other types of safety helmets. Protective helmets used for military and law enforcement uses, in particular, need to be ballistic resistant.

Typical helmets are constructed to protect against bullet fragments. Protection against rifle bullets requires improvement over such helmets in view of the significantly increased energy possessed by rifle bullets. Helmets which protect against rifle bullets should be relatively lightweight and comfortable to wear. However, previously suggested helmets were relatively heavy.

Examples of rifle bullets against which protection is desired include the NATO M80 ball, the AK 47, the AK 74, the Russian LPS and the European SS 109, and the like.

The currently most popular military helmets are formed from aramid fibers, typically in the form of several layers of aramid fibers together with a resin material, such as a phenolic resin. Helmets formed of aramid fibers are disclosed, for example, in U.S. Pat. Nos. 4,199,388, 4,778,638 and 4,908,877. Although such helmets in general perform satisfactorily, they are fairly heavy. Also, such helmets do not provide enhanced protection against rifle bullets. One problem with helmets that are relatively heavy is that they are uncomfortable to the wearer. This may result in non-use or limited use of such helmets.

Examples of helmets which are designed to protect against projectile fragments (rather than rifle bullets) are set forth in copending U.S. patent application Ser. No. 11/706,719, filed Feb. 15, 2007, the disclosure of which is incorporated herein by reference to the extent not incompatible herewith.

It would be desirable to provide a helmet which has a reduced weight and also is resistant to penetration by rifle bullets.

SUMMARY OF THE INVENTION

In accordance with this invention, there is provided a lightweight molded helmet that is resistant to penetration by rifle bullets, the helmet comprising a shell, the shell comprising from the outside to the inside:

a first plurality of fibrous layers, the fibrous layers comprising high tenacity abrasive fibers in a first resin matrix;

a second plurality of fibrous layers attached to the first plurality of fibrous layers, the second plurality of fibrous layers comprising a woven or knitted network of high tenacity fibers in a second resin matrix, the high tenacity fibers comprising polyolefin fibers; and a third plurality of fibrous layers attached to the second plurality of fibrous layers, the third plurality of fibrous layers comprising a non-woven network of high tenacity fibers in a third resin matrix, the high tenacity fibers comprising polyolefin fibers.

Also in accordance with this invention, there is provided a lightweight molded helmet that is resistant to penetration by rifle bullets, the helmet comprising a shell, the shell comprising from the outside to the inside:

a first plurality of fibrous layers, the first plurality of fibrous layers comprising a woven network of glass fibers in a first resin matrix, the first resin comprising a thermosetting resin;

a second plurality of fibrous layers attached to the first plurality of fibrous layers, the second plurality of fibrous layers comprising a woven network of high tenacity fibers in a second resin matrix, the high tenacity fibers comprising polyethylene fibers, the second resin comprising a thermosetting resin or a thermoplastic resin; and a third plurality of fibrous layers attached to the second plurality of fibrous layers, the third plurality of fibrous layers comprising a non-woven network of high tenacity fibers in a third resin matrix, the high tenacity fibers comprising polyethylene fibers, the third resin comprising a thermoplastic resin, the helmet having a total areal density of from about 3 to about 5 pounds per square foot (14.6 to 24.4 kg/m$^2$), and is resistant to rifle bullets having energies of at least about 1600 joules.

Further in accordance with this invention, there is provided a method for forming a shell of a lightweight helmet that is resistant to penetration by rifle bullets, the method comprising the steps of:

supplying a first plurality of fibrous layers to a mold, the fibrous layers comprising a network of high tenacity fibers in a first resin matrix, the high tenacity fibers comprising abrasive fibers; the first plurality of fibrous layers facing inwardly in the mold;

supplying a second plurality of fibrous layers to the mold, the second plurality of fibrous layers comprising a woven network of high tenacity fibers in a second resin matrix, the high tenacity fibers comprising polyolefin fibers, the second plurality of fibrous layers overlying the first plurality of fibrous layers, the first and second resins being compatible such that the first and second plurality of fibrous layers are bondable to each other;

supplying a third plurality of fibrous layers to the mold, the third plurality of fibrous layers comprising a non-woven network of high tenacity fibers in a third resin matrix, the high tenacity fibers comprising polyolefin fibers, the third plurality of fibrous layers overlying the second plurality of fibrous layers; and applying heat and pressure to the first plurality of fibrous layers, the second plurality of fibrous layers, and the third plurality of fibrous layers to thereby form the helmet shell.

It has been discovered that lightweight molded helmets that are resistant to penetration by rifle bullets can be formed by employing an outer fiber layer section formed of high tenacity abrasive fibers in a resin matrix, a middle fiber layer section formed of woven or knitted high tenacity polyolefin fibers in a second resin matrix, and an inner fiber layer section formed of non-woven high tenacity polyolefin fibers in a third resin matrix. The resins in each of the first, second and third fiber layer sections may be the same or different.

Such helmets have excellent ballistic resistance and are particularly useful to prevent penetration of high energy rifle bullets. At the same time, the helmets are lightweight and are thus comfortable to wear.

DETAILED DESCRIPTION OF THE INVENTION

The protective helmets of this invention include a shell formed from a first outer section comprising a plurality of layers of a network of high tenacity abrasive fibers in a resin matrix, a second middle section comprising a plurality of layers of a woven or knitted network of high tenacity polyolefin fibers in a resin matrix, and a third inner section comprising a plurality of layers of a non-woven network of high tenacity polyolefin fibers in a resin matrix.

For the purposes of the present invention, a fiber is an elongate body the length dimension of which is much greater that the transverse dimensions of width and thickness. Accordingly, the term fiber includes monofilament, multifilament, ribbon, strip, staple and other forms of chopped, cut or discontinuous fiber and the like having regular or irregular cross-section. The term "fiber" includes a plurality of any of the foregoing or a combination thereof. A yarn is a continuous strand comprised of many fibers or filaments.

As used herein, the term "high tenacity fibers" means fibers which have tenacities equal to or greater than about 7 g/d. Preferably, these fibers have initial tensile moduli of at least about 150 g/d and energies-to-break of at least about 8 J/g as measured by ASTM D2256. As used herein, the terms "initial tensile modulus", "tensile modulus" and "modulus" mean the modulus of elasticity as measured by ASTM 2256 for a yarn and by ASTM D638 for an elastomer or matrix material.

Preferably, the high tenacity fibers of the second and third sections have tenacities equal to or greater than about 10 g/d, more preferably equal to or greater than about 15 g/d, even more preferably equal to or greater than about 20 g/d, and most preferably equal to or greater than about 25 g/d. For high tenacity polyethylene fibers the preferred tenacities range from about 20 to about 55 g/d.

The cross-sections of fibers useful in this invention may vary widely. They may be circular, flat or oblong in cross-section. They also may be of irregular or regular multi-lobal cross-section having one or more regular or irregular lobes projecting from the linear or longitudinal axis of the filament. It is particularly preferred that the fibers be of substantially circular, flat or oblong cross-section, most preferably that the fibers be of substantially circular cross-section.

The yarns of the high tenacity fibers used herein may be of any suitable denier, such as, for example, about 50 to about 5000 denier, more preferably from about 200 to about 5000 denier, still more preferably from about 650 to about 3000 denier, and most preferably from about 800 to about 1500 denier.

Preferably, at least about 50% by weight, more preferably at least about 75% by weight, and most preferably all or substantially all of the fibers in the first plurality of fibrous layers are the high tenacity abrasive fibers. Similarly, preferably, at least about 50% by weight, more preferably at least about 75% by weight, and most preferably all or substantially all of the fibers in the second plurality of fibrous layers are the high tenacity polyolefin fibers. Also, preferably, at least about 50% by weight, more preferably at least about 75% by weight, and most preferably all or substantially all of the fibers in the third plurality of fibrous layers are the high tenacity polyolefin fibers.

In accordance with the invention, the helmet shell is formed from layers of different ballistic resistant materials. The helmet comprises at least three sections or groups of fibrous layers. These are an outer facing group of layers, a middle group of layers, and an inner facing group of layers.

The outer group of fibrous layers is selected such that it has abrasive characteristics such that it deforms the bullet, or strips the bullet jacket and/or otherwise destabilizes the bullet. The outer group of fibrous layers are formed from abrasive fibers. These fibers are preferably inorganic fibers that have a tensile strength of at least about 2.0 GPa, preferably at least about 2.4 GPa, more preferably at least about 3.4 GPa, and most preferably at least about 4.0 GPa. Examples of abrasive fibers useful herein include glass fibers, graphite fibers, silicon carbide fibers, boron carbide fibers, and the like, and mixtures thereof. Examples of such fibers are described, for example, in commonly assigned copending U.S. patent application Ser. No. 10/957,773, filed Oct. 4, 2004 (which corresponds to published PCT application WO2007/005043), the disclosure of which application is expressly incorporated herein by reference to the extent not inconsistent herewith. Preferably, the abrasive fibers are glass fibers.

Various types of glass fibers may be used herein, including Types E and S fibers. Examples of woven fiberglass fabrics are those designated as styles 1528, 3731, 3733, 7500, 7532, 7533, 7580, 7624, 7628 and 7645, which are available from Hexcel of Anderson, S.C., USA.

A benefit of using fiber glass as the abrasive fibers is that the cost of the helmet can be significantly decreased since the fiber glass costs only a fraction compared to the cost of the polyolefin fabrics.

The outer group of fibrous layers is preferably in the form of a plurality of woven fabric layers. However, the outer group of fibrous layers may alternatively be in the form of knitted or non-woven fabric layers. Examples of the latter are unidirectionally oriented fiber layers and random or felted fiber layers. The fiber network layers of the outer group are preferably in the same fabric format (e.g., woven, knitted or non-woven). Alternatively, there may be a mixture of the type of fabrics in the outer group of layers (woven, knitted, and/or non-woven fabrics. Woven fabrics are preferred and fabrics of any weave pattern may be employed, such as plain weave, basket weave, twill, satin, three dimensional woven fabrics, and any of their several variations.

The layers of the outer group of fibrous layers also comprise a resin matrix. Examples of the resin materials are discussed below.

As mentioned above, the fibers in the middle and inner groups of fibers comprise polyolefin fibers, preferably high tenacity polyethylene fibers and/or high tenacity polypropylene fibers. Most preferably, the polyolefin fibers are high tenacity polyethylene fibers, also known as extended chain polyethylene fibers or highly oriented high molecular weight polyethylene fibers.

U.S. Pat. No. 4,457,985 generally discusses high molecular weight polyethylene fibers and polypropylene fibers, and the disclosure of this patent is hereby incorporated by reference to the extent that it is not inconsistent herewith. In the case of polyethylene fibers, suitable fibers are those of weight average molecular weight of at least about 150,000, preferably at least about one million and more preferably between about two million and about five million. Such high molecular weight polyethylene fibers may be spun in solution (see U.S. Pat. Nos. 4,137,394 and 4,356,138), or a filament spun from a solution to form a gel structure (see U.S. Pat. No. 4,413,110, German Off. No. 3,004, 699 and GB Patent No. 2051667), or the polyethylene fibers may be produced by a rolling and drawing process (see U.S. Pat. No. 5,702,657). As used herein, the term polyethylene means a predominantly linear polyethylene material that may contain minor amounts of chain branching or comonomers not exceeding about 5 modifying units per 100 main chain carbon atoms, and that may also contain admixed therewith not more than about 50 weight percent of one or more polymeric additives such as alkene-1-polymers, in particular low density polyethylene, polypropylene or polybutylene, copolymers containing mono-olefins as primary monomers, oxidized polyolefins, graft polyolefin copolymers and polyoxymethylenes, or low molecular weight additives such as antioxidants, lubricants, ultraviolet screening agents, colorants and the like which are commonly incorporated.

High tenacity polyethylene fibers are commercially available and are sold under the trademark SPECTRA® by Honeywell International Inc. of Morristown, N.J., U.S.A. Polyethylene fibers from other sources may also be used.

Depending upon the formation technique, the draw ratio and temperatures, and other conditions, a variety of properties can be imparted to these fibers. The tenacity of the polyethylene fibers is at least about 7 g/d, preferably at least about 15 g/d, more preferably at least about 20 g/d, still more preferably at least about 25 g/d and most preferably at least about 30 g/d. Similarly, the initial tensile modulus of the fibers, as measured by an Instron tensile testing machine, is preferably at least about 300 g/d, more preferably at least about 500 g/d, still more preferably at least about 1,000 g/d and most preferably at least about 1,200 g/d. These highest values for initial tensile modulus and tenacity are generally obtainable only by employing solution grown or gel spinning processes. Many of the filaments have melting points higher than the melting point of the polymer from which they were formed. Thus, for example, high molecular weight polyethylene of about 150,000, about one million and about two million molecular weight generally have melting points in the bulk of 138° C. The highly oriented polyethylene filaments made of these materials have melting points of from about 7° C. to about 13° C. higher. Thus, a slight increase in melting point reflects the crystalline perfection and higher crystalline orientation of the filaments as compared to the bulk polymer.

Similarly, highly oriented high molecular weight polypropylene fibers of weight average molecular weight at least about 200,000, preferably at least about one million and more preferably at least about two million may be used. Such extended chain polypropylene may be formed into reasonably well oriented filaments by the techniques prescribed in the various references referred to above, and especially by the technique of U.S. Pat. No. 4,413,110. Since polypropylene is a much less crystalline material than polyethylene and contains pendant methyl groups, tenacity values achievable with polypropylene are generally substantially lower than the corresponding values for polyethylene. Accordingly, a suitable tenacity is preferably at least about 8 g/d, more preferably at least about 11 g/d. The initial tensile modulus for polypropylene is preferably at least about 160 g/d, more preferably at least about 200 g/d. The melting point of the polypropylene is generally raised several degrees by the orientation process, such that the polypropylene filament preferably has a main melting point of at least 168° C., more preferably at least 170° C. The particularly preferred ranges for the above described parameters can advantageously provide improved performance in the final article. Employing fibers having a weight average molecular weight of at least about 200,000 coupled with the preferred ranges for the above-described parameters (modulus and tenacity) can provide advantageously improved performance in the final article.

The network of high strength fibers polyolefin fibers of the middle section of fibrous layers are in the form of a woven or knitted fabric. Woven fabrics are preferred and fabrics of any weave pattern may be employed, such as plain weave, basket weave, twill, satin, three dimensional woven fabrics, and any of their several variations. Plain weave fabrics are preferred and more preferred are plain weave fabrics having an equal warp and weft count.

In one embodiment, the woven fabric preferably has between about 15 and about 55 ends per inch (about 5.9 to about 21.6 ends per cm) in both the warp and fill directions, and more preferably between about 17 and about 45 ends per inch (about 6.7 to about 17.7 ends per cm). The yarns preferably have a denier of from about 375 to about 1300. The result is a woven fabric weighing preferably between about 5 and about 19 ounces per square yard (about 169.5 to about 644.1 g/m$^2$), and more preferably between about 5 and about 11 ounces per square yard (about 169.5 to about 373.0 g/m$^2$). Examples of such fabrics are those designated as SPECTRA® fabric styles 902, 903, 904, 952, 955 and 960. Other examples included fabrics formed from basket weaves, such as SPECTRA® fabric style 912. The foregoing fabrics are available, for example, from Hexcel. As those skilled in the art will appreciate, the fabric constructions described here are exemplary only and not intended to limit the invention thereto.

Where knitted fabrics are used in the middle section of fibrous layers (or in the outer section of fibrous layers), different knit structures may be employed. Knit structures are constructions composed of intermeshing loops. Oriented knitted structures are preferred as they use straight inlaid yarns held in place by fine denier knitted stitches. The yarns are absolutely straight without the crimp effect found in woven fabrics due to the interlacing effect on the yarns. These laid in yarns can be oriented in a monoaxial, biaxial or multiaxial direction depending on the engineered requirements. It is preferred that the specific knit equipment used in laying in the load bearing yarns is such that the yarns are not pierced through.

The layers of the middle group of fibrous layers likewise also comprise a resin matrix. Examples of the resin materials are discussed below.

As mentioned above, the inner group of fibrous layers also comprise high tenacity polyolefin fibers, most preferably high tenacity polyethylene fibers. These fibrous layers are in the form of non-woven networks of fibers, such as such as plies of unidirectionally oriented fibers, or fibers which are felted in a random orientation. Where unidirectionally oriented fibers are employed, preferably they are used in a cross-ply arrangement in which one layer of fibers extend in one direction and a second layer of fibers which extend in a direction 90° from the first fibers. Where the individual plies are unidirectionally oriented fibers, the successive plies are preferably rotated relative to one another, for example at angles of 0°/90°, 0°/90/0°/90 or 0°/45°/90°/45°/0° or at other angles. Where the networks of fibers are in the form of a felt, they may be needle punched felts. A felt is a non-woven network of randomly oriented fibers, preferably at least one of which is a discontinuous fiber, preferably a staple fiber having a length ranging from about 0.25 inch (0.64 cm) to about 10 inches (25.4 cm). These felts may be formed by several techniques known in the art, such as by carding or fluid laying, melt blowing and spin laying. The network of fibers is consolidated mechanically such as by needle punching, stitch-bonding, hydro-entanglement, air entanglement, spun bond, spun lace or the like, chemically such as with an adhesive, or thermally with a fiber to point bond or a blended fiber with a lower melting point. The preferred consolidation method is needle punching alone or followed by one of the other methods. The preferred felt is a needle punched felt. Where non-woven structures are employed in the first group of abrasive fibers, they may have similar constructions to those mentioned herein.

The layers of the inner group of fibrous layers likewise also comprise a resin matrix. Examples of the resin materials are discussed below.

The fibrous layers of each of the outer, middle and inner sections of the helmet shell also include a resin matrix. The resin matrix for the fiber plies may be formed from a wide variety of elastomeric and other materials having desired characteristics. In one embodiment, elastomeric materials used in such matrix possess initial tensile modulus (modulus of elasticity) equal to or less than about 6,000 psi (41.4 MPa) as measured by ASTM D638. More preferably, the elastomer has initial tensile modulus equal to or less than about 2,400 psi (16.5 MPa). Most preferably, the elastomeric material has initial tensile modulus equal to or less than about 1,200 psi (8.23 MPa). These resinous materials are typically thermoplastic in nature but thermosetting materials are also useful.

The resin matrix may alternatively be selected to have a high tensile modulus when cured, such as at least about $1 \times 10^6$ psi (6895 MPa) as measured by ASTM D638. Examples of such materials are disclosed, for example, in U.S. Pat. No. 6,642,159, the disclosure of which is expressly incorporated herein by reference to the extent not inconsistent herewith.

A wide variety of materials may be utilized as the resin matrix for each of the outer, middle and inner section of fibrous layers, including thermoplastic and thermosetting resins. For example, any of the following materials may be employed: polybutadiene, polyisoprene, natural rubber, ethylene-propylene copolymers, ethylene-propylene-diene terpolymers, polysulfide polymers, thermoplastic polyurethanes, polyurethane elastomers, chlorosulfonated polyethylene, polychloroprene, plasticized polyvinylchloride using dioctyl phthalate or other plasticizers well known in the art, butadiene acrylonitrile elastomers, poly(isobutylene-co-isoprene), polyacrylates, polyesters, polyethers, fluoroelastomers, silicone elastomers, thermoplastic elastomers, and copolymers of ethylene. Examples of thermosetting resins include those which are soluble in carbon-carbon saturated solvents such as methyl ethyl ketone, acetone, ethanol, methanol, isopropyl alcohol, cyclohexane, ethyl acetone, and combinations thereof. Among the thermosetting resins are vinyl esters, styrene-butadiene block copolymers, diallyl phthalate, phenolic resins such as phenol formaldehyde, polyvinyl butyral, epoxy resins, polyester resins, thermosetting polyurethane resins, and mixtures thereof, and the like. Included are those resins that are disclosed in the aforementioned U.S. Pat. No. 6,642,159. Preferred thermosetting resins include epoxy resins, urethane resins, polyester resins, vinyl ester resins, phenolic resins, and mixtures thereof. Preferred thermosetting resins for polyethylene fiber fabrics include at least one vinyl ester, diallyl phthalate, and optionally a catalyst for curing the vinyl ester resin. Other thermosetting resins include melamine resins, acrylate resins, silicone resins, polyurea resins, and the like.

One preferred group of resins are thermoplastic polyurethane resins. Another preferred group are elastomeric materials that are block copolymers of conjugated dienes and vinyl aromatic copolymers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type R–(BA)$_x$(x=3-150); wherein A is a block from a polyvinyl aromatic monomer and B is a block from a conjugated diene elastomer. A preferred resin matrix is an isoprene-styrene-isoprene block copolymer, such as Kraton® D1107 isoprene-styrene-isoprene block copolymer available from Kraton Polymer LLC. These resins may be dispersed in water or in an organic solvent. One type of thermoplastic polyurethane resin is a copolymer mix of polyurethane resins dispersed in water.

The resin material may be compounded with fillers such as carbon black, silica, etc and may be extended with oils and vulcanized by sulfur, peroxide, metal oxide or radiation cure systems using methods well known to rubber technologists. Blends of different resins may also be used.

Preferably, the resin matrix in each of the plurality of fibrous layers are either the same as or are compatible with the resin matrix in the other plurality or pluralities of fibrous layers. By "compatible" is meant that the various layers may be bonded together by chemical means or mechanical means. For example, the chemistry of the resins of various groups of layers is preferably compatible such that various layers can be processed under the same molding pressure, temperature and molding duration conditions. This ensures that the helmet shell can be molded in one efficient cycle. In one embodiment, the resin of the outer group of fibrous layers is compatible with the resin of the middle group of fibrous layers such that those layers bond together. Preferably, the resin in the outer group of fibrous layers and the resin in the middle group of fibrous layers are chemically the same, and the resin in the inner group of fibrous layers is chemically different from the other resins.

Preferred resins for the outer group of fibrous layers are thermosetting resins, more preferably vinyl ester resins. Preferred resins for the middle group of fibrous layers are thermosetting or thermoplastic resins, more preferably vinyl ester resins when a thermosetting resin is employed. Also preferred for the middle group of fibrous layers are thermoplastic polyurethane resins and/or styrene-isoprene-styrene block copolymers. Preferred resins for the inner group of fibrous layers are thermoplastic resins, more preferably thermoplastic polyurethane resins and/or styrene-isoprene-styrene block copolymers.

The proportion of the resin matrix material to fiber in each of the three sections of the helmet shell may vary widely depending. In general, the resin matrix material preferably forms about 1 to about 98 percent by weight, more preferably from about 5 to about 95 percent by weight, and still more preferably from about 5 to about 40 percent by weight, of the total weight of the fibers and resin matrix in the layers. The above percentages are based on the consolidated fabrics. Most preferably, the resin in the outer group of fibrous layers comprises from about 5 to about 25 weight percent of the total weight of the outer fibrous layers; the resin in the middle group of fibrous layers comprises from about 10 to about 25 weight percent of the total weight of the middle fibrous layers; and the resin in the inner group of fibrous layers comprises from about 10 to about 40 weight percent of the total weight of the inner fibrous layers.

Preferably, each of the plurality of fibrous layers is coated or impregnated with the resin matrix prior to molding, so as to form prepreg fabrics. In general, the fibrous layers of the invention are preferably formed by constructing a fiber network initially (e.g., starting with a woven, knitted or non-woven fabric layer) and then coating the network with the matrix composition. As used herein, the term "coating" is used in a broad sense to describe a fiber network wherein the individual fibers either have a continuous layer of the matrix composition surrounding the fibers or a discontinuous layer of the matrix composition on the surfaced of the fibers. In the former case, it can be said that the fibers are fully embedded in the matrix composition. The terms coating and impregnating are interchangeably used herein. Although it is possible to apply the resin matrix to resin-free fibrous layers while in the mold, this is less desirable since the uniformity of the resin coating may be difficult to control.

The matrix resin composition may be applied in any suitable manner, such as a solution, dispersion or emulsion, onto the fibrous layers. The matrix-coated fiber network is then dried. The solution, dispersion or emulsion of the matrix resin may be sprayed onto the filaments. Alternatively, the fibrous layer structure may be coated with the aqueous solution, dispersion or emulsion by dipping or by means of a roll coater or the like. After coating, the coated fibrous layer may then be passed through an oven for drying in which the coated fiber network layer or layers are subjected to sufficient heat to evaporate the water or other liquid in the matrix composition. The coated fibrous network may then be placed on a carrier web, which can be a paper or a film substrate, or the fabrics may initially be placed on a carrier web before coating with the matrix resin. The substrate and the resin matrix containing fabric layer or layers can then be wound up into a continuous roll in a known manner.

The fiber networks can be constructed via a variety of methods. In the case of unidirectionally aligned fiber networks, yarn bundles of the high tenacity filaments may be supplied from a creel and led through guides and one or more spreader bars into a collimating comb prior to coating with the matrix material. The collimating comb aligns the filaments coplanarly and in a substantially unidirectional fashion.

Following coating of the fabric layers with the resin matrix, the layers may be pre-formed in a helmet shape, with the fibrous layers either not bonded to each other or only slightly attached to each other for ease of handling. Such pre-forming aids in the final molding process.

The number of layers in each section of the plurality of fibrous layers may vary widely, depending on the type of helmet desired, the desired performance and the desired weight. For example, the number of layers in each section of the plurality of fibrous layers may range from about 2 to about 100 layers, more preferably from about 2 to about 85 layers, and most preferably from about 2 to about 65 layers. The number of layers in each section of the plurality of fibrous layers may be different or may be the same. The layers may be of any suitable thickness. For example, each layer of a section of the plurality of fibrous layers may have a thickness of from about 1 mil to about 40 mils (25 to 1016 µm), more preferably from about 3 to about 30 mils (76 to 762 µm), and most preferably from about 5 to about 20 mils (127 to 508 µm). The thickness of each layer of each plurality of fibrous networks may be the same or different.

The areal density of each layer in each section of the plurality of fibrous layers may vary widely but is usually chosen so that the overall weight of the helmet is within an acceptable range for the comfort and protection of the wearer. For example, the areal density of each layer in the outer section of the plurality of fibrous layers preferably may range from about 5 to about 35 oz/yd$^2$ (about 169.5 to about 1186.5 g/m$^2$), more preferably from about 5 to about 25 oz/yd$^2$ (about 169.5 to about 847.5 g/m$^2$). The areal density of each layer in the middle section of the plurality of fibrous layers preferably may range from about 5 to about 65 oz/yd$^2$ (about 169.5 to about 2203.5 g/m$^2$), more preferably from about 5 to about 14 oz/yd$^2$ (about 169.5 to about 474.7 g/m$^2$). The areal density of each layer in the inner section of the plurality of fibrous layers preferably may range from about 1 to about 90 oz/yd$^2$ (about 33.9 to about 3051 g/m$^2$), more preferably from about 1 to about 7 oz/yd$^2$ (about 33.9 to about 237.3 g/m$^2$). The areal densities of the fibrous layers in each of the outer, middle and inner sections may be the same or different.

The weight ratio of the layers may vary as desired. The outer group of fibrous layers may be present in an amount, based on the total weight of the helmet shell, of from about 2 to about 35 weight percent, more preferably from about 5 to about 15 weight percent, and most preferably not more than about 10 weight percent. The middle group of fibrous layers may be present in an amount, based on the total weight of the helmet shell, of from about 2 to about 65 weight percent, more preferably from about 10 to about 50 weight percent, and most preferably not more than about 40 weight percent. The inner group of fibrous layers may be present in an amount, based on the total weight of the helmet shell, of from about 5 to about 96 weight percent, more preferably from about 20 to about 90 weight percent, and most preferably at least about 60 weight percent.

As mentioned above, the helmet shells of this invention are "lightweight". By lightweight is meant that the total areal density is less than about 5 pounds per square foot (24.4 kg/m$^2$). Preferably, the total areal density of the helmet shells range from about 3 to about 5 pounds per square (about 14.6 to about 24.4 kg/m$^2$).

One type of helmet shape that has been employed in military applications is known by the acronym ACH (Advanced Combat Helmet). Desirably, such helmets (although not rifle bullet resistant) have a weight in the range of from about 900 to about 1500 grams, and more preferably from about 1000 to about 1300 grams.

To form the helmet shells of this invention, stacks of each section of the fibrous layers are placed in a suitable mold of any desired shape. It is desirable to form the shell from the three sections in a single molding step for efficiency. However, if desired one or two of the sections may be first molded before the other sections are introduced into the mold. The mold may be of any desired shape, such as a bowl shape, an oval shape, etc.

Preferably, first a stack of loosely bonded or unbonded layers forming the outer section of the shell is placed into the mold. Such stack may be pre-formed to approximately the desired shape. Next, a stack of loosely bonded or unbonded layers forming the middle section of the shell is placed on top of the outer section layers. Following this, a stack of loosely bonded or unbonded layers forming the inner section of the shell is placed on top of the middle section layers. Where unidirectionally oriented fabrics are employed as the non-woven fabric layers of the inner section of the shell, two or more layers are preferably first cross-plied with each other, such as at angles of 0°/90°, 0°/90°/0°/90°, etc. These cross-plied structures (commonly referred to as shield products) are then introduced into the mold. The stack of the middle and inner sections of the helmet may also be preformed to approximately the desired shape.

No adhesive is required to be used between the individual layers or sections of layers of the high tenacity fibers, since the resin or resins of the individual layers provide the requisite bonding between the layers. However, a separate adhesive layer or layers may be used if desired.

Care should be taken to completely and uniformly fill the mold and place all of the layers in the proper orientation. This ensures uniform performance throughout the helmet shell. If the combined volume of the fibrous sections is more than the helmet mold can handle, the mold will not close and hence the helmet will not be molded. If the combined volume of the materials is less than the volume of the mold, although the mold will close the material may not be molded due to lack of molding pressure.

Once the mold is properly loaded with the requisite number and type of fibrous layers, the helmet shell can be molded under the desired molding conditions. These conditions can be similar to those employed in molding separate layers of aramid fabrics and separate layers of polyethylene fabrics. For example, the molding temperature may range from about 65 to about 250° F., more preferably from about 90 to about 330°F., and most preferably from about 120 to about 320°F. The clamp molding pressure may range, for example, from about 10 to about 500 tons (10.2 to 508 metric tons), more preferably from about 50 to about 350 tons (50.8 to 356 metric tons), and most preferably from about 100 to about 200 tons (102 to 203 metric tons). The molding times may range from about 5 to about 60 minutes, more preferably from about 10 to about 35 minutes, and most preferably from about 15 to about 25 minutes.

Under the desired conditions of molding, the resin or resins present in the fibrous networks is cured in the case of thermosetting resins. This results in strong bonding of the individual layers and groups of layers into the desired helmet shape as an integral, monolithic molding. It is believed that the thermosetting resins of each set of fabrics are bonded at their interfaces by cross-linking of the resins. For thermoplastic resins the helmet is cooled down below the softening temperature of the resin and then pull out from the mold. Under heat and pressure, the thermoplastic resins flow between the fabric layers, also resulting in an integral, monolithic molding. During cooling the molding pressure is maintained. The molded product is thereafter taken from the mold and the part is trimmed, if necessary.

The fabrics used in the composite structure are relatively thin yet very strong. The preferred thickness of the individual fabric layers are from about 1 to about 36 mils (25 to 911 μm), more preferably from about 3 to about 28 mils (76.2 to 711 μm), and most preferably from about 5 to about 23 mils (127 to 584 μm).

As mentioned earlier, the helmets of this invention are capable of preventing penetration of rifle bullets. Such bullets have very high energy levels. The helmets of this invention are capable of preventing penetration by bullets that have energy levels of at least about 1600 joules, more preferably bullets that have energy levels of from about 1600 to about 4000 joules, and most preferably bullets that have energy levels of from about 1700 to about 3000 joules.

The following is a list of various bullets and their energy levels, with the velocities and energy measured at the muzzle. It can be seen that the rifle bullets have much higher energy levels than handgun bullets, and are thus more difficult to stop from penetrating helmets.

TABLE 1

Kinetic Energy of Bullets

| Bullet | Mass, grain (g) | Velocity, mps | Energy, Joules |
|---|---|---|---|
| 9 MM FMJ | 124 (g) | 373 ± 10 | 537 |
| 357 | 158 (9.5 g) | 440 ± 10 | 958 |
| 44 Mag | 240 (15 g) | 441 ± 10 | 1510 |
| AK 47 | 128 (8 g) | 900 ± 10 | 1960 |
| NATO (M80) | (9.5 g) | 810 ± 10 | 3000 |
| AK74 | (3.4 g) | 750 ± 10 | 1700 |
| LPS | 179 (11.6 g) | 804 ± 10 | 3814 |

Even though the helmets of this invention are lightweight, due to their unique construction they are capable of preventing penetration of high energy rifle bullets. This combination of desirable weight and ballistic resistance means that the helmets would be more readily used by personnel who need to be protected from high energy level threats.

The helmet structure can be adapted to receive a variety of attachments as desired. For example, the helmet may be formed with grooves or built in channels to facilitate attachment of desired gear.

While not being bound to any particular theory, it is believed that the outer section containing fibrous layers of abrasive fibers acts to deform the rifle bullet and its jacket. The middle section containing layers of woven or knitted high tenacity polyolefin fibers peels away the bullet jacket or outer casing. The inner section containing layers of non-woven high tenacity polyolefin fibers deforms the rest of the bullet and captures it, thereby preventing penetration through the helmet.

The following non-limiting examples are presented to provide a more complete understanding of the invention. The specific techniques, conditions, materials, proportions and reported data set forth to illustrate the principles of the invention are exemplary and should not be construed as limiting the scope of the invention. All percents are by weight, unless otherwise stated.

EXAMPLES

Example 1

A helmet shell is formed from three different sections of high tenacity fibers. The outer layers are formed of fiber glass in a woven construction (Style 7628 from Hexcel, which is a plain weave 17×12 ends per inch (6.7×4.7 ends per cm). The individual woven fiber glass layers are coated with a vinyl ester resin (Derakane 411-25 resin from Ashland Chemical) by dipping the woven fabric into a container of the resin in acetone solvent and a curing agent. After drying, the woven fiber glass layers are found to have 10 percent by weight of the vinyl ester resin. The areal density of each layer is 200 g/m². A total of 2 layers of the woven fiber glass composite are loosely stacked and pre-formed into the approximate shape of a helmet.

The middle layers of the helmet shell are formed from a woven high tenacity polyethylene fiber (Spectra® 900 from Honeywell International Inc.). These fibers have a tenacity of 30 g/d. The woven fabric is style 903 from Hexcel which is a plain weave 21×21 ends per inch (8.3×8.3 ends per cm) fabric. Individual woven polyethylene fiber layers are coated with the same vinyl ester resin as used with the fiber glass layers by dipping the fabric into a container of the resin solution. After drying, the woven polyethylene fiber layers are found to have 20 percent by weight of the vinyl ester resin. The areal density of each layer is 296 g/m². A total of 2 layers of the woven high tenacity polyethylene fiber composites are loosely stacked and pre-formed into the approximate shape of a helmet.

The inner layers of the helmet shell are formed from unidirectionally oriented high tenacity polyethylene fibers (Spectra® 3000 from Honeywell International Inc.) having a denier of 1300. A web of the unidirectionally oriented fibers are passed through a coating bath containing a thermoplastic polyurethane resin in water, and after drying the resin is found to comprise 16 percent by weight of the non-woven fabric layer. Four layers of these layers are cross-plied at 0°/90°/0°/90° and laminated together to form a four-ply shield product. The areal density of the four-ply composite is 257 g/m². A total of 67 layers of the four-ply layers are loosely stacked together, with the fiber orientation of adjacent fiber layers being offset 90° from each other. The fiber layers are pre-formed into the approximate shape of a helmet.

The three sections of the helmet shell are introduced into a mold having the desired helmet shape (ACH mold), with the outer layers being first placed into the mold, followed by the middle layers and then followed by the inner layers. The stack of layers is molded under 190 ton (193 metric ton) clamp pressure at 90° F. (32° C.) for 15 minutes of heating, followed by a cool down to 220° F. (104° C.) for 15 minutes. After releasing from the mold, the edges of the helmet shell are trimmed. The total areal density of the helmet shell is 3.75 pounds per square foot (18.31 kg/m²).

The helmet shell is tested against rifle bullets (AK47, AK74 and NATO Ball) under MIL-STD-662F standard and are found to resist penetration of such bullets.

Example 2

A helmet was prepared as in Example 1, except that the resin used in the middle layers is the same type of thermoplastic polyurethane resin used in the layers of the inner section. The resin content of the middle fibrous layers is 20 weight percent.

The helmet shell is tested as in Example 1, and similar results are noted.

Example 3

A helmet is prepared as in Example 1, except that the resin in the inner layers is a styrene-isoprene-styrene block copolymer (Kraton D-1107). The resin content of the inner fibrous layers was 17 weight percent. The helmet shell is tested as in Example 1, and similar results are noted.

The helmets of this invention are lightweight and yet have excellent resistance to rifle bullets. The helmets also have excellent impact resistance and structural rigidity. The helmets are useful in military and non-military applications, such as law enforcement helmets, sporting helmets and other types of safety helmets.

Having thus described the invention in rather full detail, it will be understood that such detail need not be strictly adhered to but that further changes and modifications may suggest themselves to one skilled in the art, all falling within the scope of the invention as defined by the subjoined claims.

What is claimed:

1. A lightweight molded helmet that is resistant to penetration by rifle bullets, said helmet comprising a shell, said shell comprising from the outside to the inside:

a first plurality of fibrous layers, said fibrous layers comprising high tenacity abrasive fibers impregnated with a first resin matrix;

a second plurality of fibrous layers attached to said first plurality of fibrous layers, said second plurality of fibrous layers comprising a woven or knitted network of high tenacity fibers impregnated with a second resin matrix, said high tenacity fibers comprising polyolefin fibers; and a third plurality of fibrous layers attached to said second plurality of fibrous layers, said third plurality of fibrous layers comprising a non-woven network of high tenacity fibers impregnated with a third resin matrix, said high tenacity fibers comprising polyolefin fibers.

2. The helmet of claim 1 wherein said second and third plurality of fibrous layers comprise polyethylene fibers.

3. The helmet of claim 2 wherein said third plurality of fibrous layers comprises unidirectionally oriented fiber layers that are oriented with respect to one another.

4. The helmet of claim 1 wherein the fibers of the first plurality of fibrous layers are fully embedded in the first resin matrix; the fibers of the second plurality of fibrous layers are fully embedded in the second resin matrix; and the fibers of the third plurality of fibrous layers are fully embedded in the third resin matrix.

5. The helmet of claim 4 wherein said first resin comprises a thermosetting resin, said second resin comprises a thermosetting or thermoplastic resin, and said third resin comprises a thermoplastic resin.

6. The helmet of claim 5 wherein said thermosetting resins are selected from the group consisting of epoxy resins, urethane resins, polyester resins, vinyl ester resins, phenolic resins, and mixtures thereof.

7. The helmet of claim 5 wherein said thermoplastic resins are selected from the group consisting of polyurethane resins, block copolymers of a conjugated diene and a vinyl aromatic monomer, and mixtures thereof.

8. The helmet of claim 1 wherein said first resin and said second resin are compatible such that said first and second plurality of fibrous layers are bonded together.

9. The helmet of claim 1 wherein said first resin and said second resin are chemically the same and said third resin is chemically different from said first and second resins.

10. The helmet of claim 1 wherein said first and second resins each comprise a vinyl ester resin.

11. The helmet of claim 10 wherein said third resin comprises a thermoplastic polyurethane resin.

12. The helmet of claim 10 wherein said third resin comprises a styrene-isoprene-styrene lock copolymer.

13. The helmet of claim 1 wherein said abrasive fibers comprise glass fibers.

14. The helmet of claim 1 wherein said first plurality of fibrous layers comprises from about 2 to about 35 weight percent of said shell, said second plurality of fibrous layers comprises from about 2 to about 65 weight percent of said shell, and said third plurality of fibrous layers comprises from about 5 to about 96 weight percent of said shell.

15. The helmet of claim 1 wherein said first plurality of fibrous layers comprises woven fabrics.

16. The helmet of claim 1 wherein the areal density of said fibrous layers of said first plurality of fibrous layers is from about 5 to about 35 oz./yd² (169.5 to 1186.5 g/m²), the areal density of said fibrous layers of said second plurality of fibrous layers is from about 5 to about 65 oz./yd² (169.5 to 2203 g/m²), and the areal density of said fibrous layers of said third plurality of fibrous layers is from about 1 to about 90 oz./yd² (33.9 to 3051 g/m²).

17. The helmet of claim 1 wherein the areal density of said fibrous layers of said first plurality of fibrous layers is from about 5 to about 25 oz./yd$^2$ (169.5 to 847.5 g/m$^2$), the areal density of said fibrous layers of said second plurality of fibrous layers is from about 5 to about 14 oz./yd$^2$ (169.5 to 474.7 g/m$^2$), and the areal density of said fibrous layers of said third plurality of fibrous layers is from about 1 to about 7 oz./yd$^2$ (33.9 to 237.3 g/m$^2$).

18. The helmet of claim 1 wherein said first resin comprises from about 5 about 25 weight percent of the total weight of said first plurality of fibrous layers, said second resin comprises from about 10 to about 25 weight percent of the total weight of said second plurality of fibrous layers, and said third resin comprises from about 10 to about 40 weight percent of the total weight of said third plurality of fibrous layers.

19. A lightweight molded helmet that is resistant to penetration by rifle bullets, said helmet comprising a shell, said shell comprising from the outside to the inside:
   a first plurality of fibrous layers, said first plurality of fibrous layers comprising a woven network of high tenacity glass fibers impregnated with and fully embedded in a first resin matrix, said first resin comprising a thermosetting resin;
   a second plurality of fibrous layers attached to said first plurality of fibrous layers, said second plurality of fibrous layers comprising a woven network of high tenacity fibers impregnated with and fully embedded in a second resin matrix, said high tenacity fibers comprising polyethylene fibers, said second resin comprising a thermosetting resin or thermoplastic resin; and
   a third plurality of fibrous layers attached to said second plurality of fibrous layers, said third plurality of fibrous layers comprising a non-woven network of high tenacity fibers impregnated with and fully embedded in a third resin matrix, said high tenacity fibers comprising polyethylene fibers, said third resin comprising a thermoplastic resin,
   said helmet having a total areal density of from about 3 to about 5 pounds per square foot (14.6 to 24.4 kg/m$^2$), and is resistant to rifle bullets having energies of at least about 1600 joules.

20. A method for forming a shell of a lightweight helmet that is resistant to penetration by rifle bullets, said method comprising the steps of:
   supplying a first plurality of fibrous layers to a mold, said fibrous layers comprising a network of high tenacity fibers impregnated with a first resin matrix, said high tenacity fibers comprising abrasive fibers; said first plurality of fibrous layers facing inwardly in said mold;
   supplying a second plurality of fibrous layers to said mold, said second plurality of fibrous layers comprising a woven network of high tenacity fibers impregnated with a second resin matrix, said high tenacity fibers comprising polyolefin fibers, said second plurality of fibrous layers overlying said first plurality of fibrous layers, said first and second resins being compatible such that said first and second plurality of fibrous layers are bondable to each other;
   supplying a third plurality of fibrous layers to said mold, said third plurality of fibrous layers comprising a non-woven network of high tenacity fibers impregnated with a third resin matrix, said high tenacity fibers comprising polyolefin fibers, said third plurality of fibrous layers overlying said second plurality of fibrous layers; and
   applying heat and pressure to said first plurality of fibrous layers, said second plurality of fibrous layers, and said third plurality of fibrous layers to thereby form said helmet shell.

* * * * *